United States Patent [19]

Meeks

[11] 3,949,708

[45] Apr. 13, 1976

[54] EAR TAG FOR CONTROLLING HOG LOUSE

[76] Inventor: David L. Meeks, P.O. Box 42, Farwell, Tex. 79325

[22] Filed: Sept. 30, 1974

[21] Appl. No.: 510,747

[52] U.S. Cl. .................................. 119/156; 40/301
[51] Int. Cl.² ................... A01K 13/00; A01K 29/00
[58] Field of Search ...... 119/156, 106, 135; 40/301, 40/302

[56] References Cited
UNITED STATES PATENTS

| | | |
|---|---|---|
| 3,318,769 | 5/1967 | Folckemer et al. .......... 119/156 UX |
| 3,334,434 | 8/1967 | Melin ............................. 119/135 X |
| 3,512,289 | 5/1970 | Hayes ................................ 40/301 |
| 3,756,200 | 9/1973 | Ohlhausen .......................... 119/156 |

Primary Examiner—Hugh R. Chamblee
Attorney, Agent, or Firm—Wendell Coffee

[57] ABSTRACT

During its life cycle, the hog louse migrates to the ear of the hog; therefore, an ear tag with dichlorvos resin impregnated strip thereon will kill all the hog lice. A specially designed ear tag has been made to contain the dichlorvos strip or whatever material is desired to be placed therein.

3 Claims, 4 Drawing Figures

EAR TAG FOR CONTROLLING HOG LOUSE

BACKGROUND OF THE INVENTION

1. Field of the Invention

This invention relates to animal husbandry and more particularly to the control and eradication of the *Haematopinus suis* L.

2. Description of the Prior Art

Dichlorvos is the common name for 2,2-dichlorovinyl dimethyl phosphate, which is commonly sold under the trademark "Vapona". This material has been found effective in the control of horn flies by placing resin strips around the neck of cattle. (Journal of Economic Entomology, Vol. 63, pg. 1688, October, 1970). Also, it has been used for controlling short-nosed cattle lice. (Journal of Economic Entomology, Vol. 61, pg. 1128, August 1968).

This product is also commonly used to manufacture collars for controlling fleas on household pets.

SUMMARY OF THE INVENTION

1. New and Different Function.

Before my invention, hog lice were a pest which was extremely difficult to control. Previous methods of control included treatment by dipping or spraying the entire hog and its surroundings.

I have discovered that during the life cycle of the louse, it moves to the ear. Therefore, if the dichlorvos strip is located at the ear, a very small dose is sufficient to effectively kill the louse in this area and within a predetermined period of time will eradicate the louse on any given animal.

In this case, a particular type of ear tag has been designed with a pocket or cavity for holding the small strip of resin or any other material desired to be placed at the ear of an animal.

2. Objects of this Invention.

An object of this invention is to eradicate hog lice.

Another object is to provide for any material to be placed in an ear tag.

Further objects are to achieve the above with a device that is sturdy, compact, durable, lightweight, simple, safe, efficient, versatile, and reliable, yet inexpensive and easy to manufacture, install, operate, and maintain.

Other objects are to achieve the above with a method that is versatile, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not to the same scale.

Figure 1:
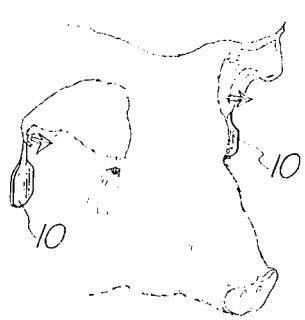
FIG. 1 is a view of the hog with an ear tag in each ear.
Figure 2:
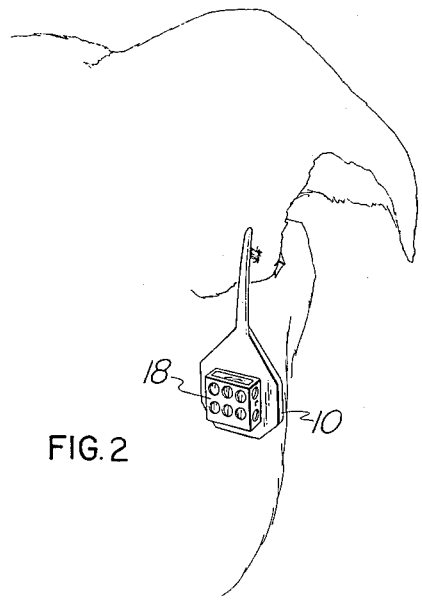
FIG. 2 is an enlarged view of one ear tag according to this invention in situ.
Figure 3:
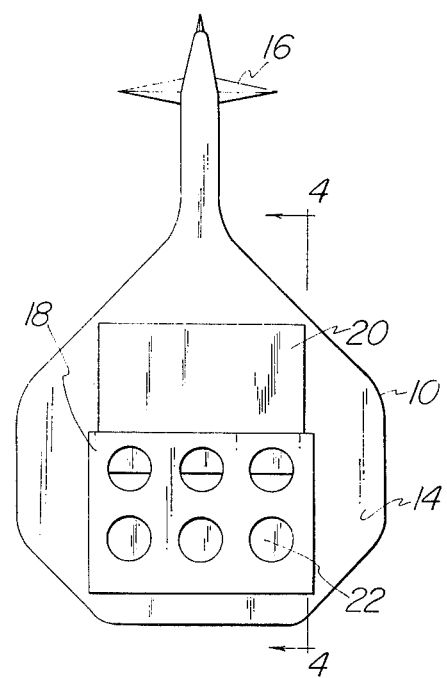
FIG. 3 is an elevational view of the tag with the material partially inserted in the pocket.
Figure 4:
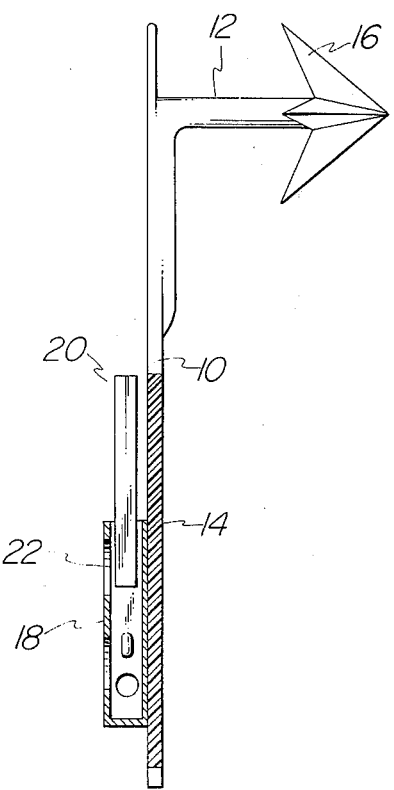
FIG. 4 is a sectional view taken on line 4—4 of FIG. 3 showing the tag.

DESCRIPTION OF THE PREFERRED EMBODIMENT:

Hog lice have an incomplete metamorphisis, i.e., the immatures or nymphs are nearly identical to the adult except in size. The eggs or "nits" are layed on the individual hairs next to the body on the neck, fore and hind flanks and the axilla (perianal region) between the hind legs. The nymphs upon hatching, travel to various areas on the body to begin feeding (sucking blood). This "nymphal mobility pattern" correlates very definitely with the way the hair lies on a hog. The nymph, upon hatching, travels against the grain of the hair and will eventually reach the mid-line of the back. Thereafter, the louse will travel up to the head and begin feeding in or around the ear. The immature louse has a definite preference for feeding on the inside of the ear due, in part or combination, to the capillaries of the blood vessels being very near to the surface of the skin and to the fact that lice may have a preference to heat and protection generally afforded by the animal's ear. The adults themselves are extremely mobile, and while not having to feed in the ear, exhibit tendencies to remain around the ear.

The life cycle of the hog louse, egg to egg stage, takes about 25 to 27 days. This is broken down as follows:

| | |
|---|---|
| Egg stage | 12–14 days |
| Nymph stage | 911 days |
| Maturity is reached | 2–3 days |

Therefore, it may be seen that it is not necessary to kill lice over the entire body of the hog. If the lice are killed around the ears only, effective control, if not complete eradication, of the lice will be achieved.

TEST NO. 1

The first test was conducted under a dry-lot management system and the results were: complete control in 72 hours, with residual control lasting until termination of the test, 28 days later.

TEST NO. 2

The second test was conducted under a confinement management system and the results were: complete control within 72 hours with control lasting for 28 days, the remainder of the test.

The tests were conducted by cutting 6-gram strips of resin which have been impregnated with 20% dichloruos as are commonly sold as medalions for control of fleas on household pests and obtained from Zoecon-Thuron Chemical Company of Dallas, Texas. These strips were hung from each of the ears of the hog by metal hog rings. The same strips remained for the entire test.

The drawing shows a preferred type of embodiment for an ear tag 10 to practice this invention.

As may be seen, it is an adaptation of tags well known and commonly on the market. I.e., there is a flat, planer tab or surface 14. The flat surface is adapted to have an indicium such as a number placed thereon. These tags are commonly used in animal husbandry to identify the animals. Spike 12 is attached to right angles to tab 10. The spike has retainer flaps 16 thereon to retain the tab in the ear. As described to this point the tab is standard. It will be understood that the spike and flaps form means for attaching the tag to the ear of the animal.

These means may take different forms in tags of different manufacturers.

Upon the planer surface or flat surface 14 of the tag 10, I have formed pocket 18. The pocket is formed by having a loop of the material attached to the tag. The tags are customarily made of "plastic" or other synthetic material.

Material 20 (in this case in the form of resin impregnated with dichlorvos) is inserted into the pocket 18. The pocket 18 is rectangular in shape and is open at the top. A plurality of holes 22 in the pocket 18 prevent air circulation around material 20.

Therefore, it may be seen that I have provided an ear tag which identification of the animal and also a pocket into which the dichlorvos strips may be inserted. Also, if any other material, such as some other insecticide or pesticide or other material, is desired to be inserted therein, it can be done. In addition, after the effective life of the first strip has expired, fresh material may be inserted in the pockets.

The embodiment shown and described above is only exemplary. I do not claim to have invented all the parts, elements or steps described. Various modifications can be made in the construction, material, arrangement, and operation, and be e within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. An ear tag for animals comprising:
   a. a planer surface adapted for having an indicium placed thereon,
   b. a spike on the tag having the planer surface for inserting through the ear of the animal,
   c. retainer flaps on the spike for retaining the spike through the ear and thus the tag on the ear,
   d. an insecticide attached to the tag,
   e. a pocket on the opposite side of the tag from the surface adapted to receive indicium,
   f. the surface adapted to receive the indicium being larger than the pocket, and
   g. said insecticide is in said pocket.

2. The invention as defined in claim 1 wherein said insecticide is a 6 gm strip of resin with 20% dichlorvos.

3. The invention as defined in claim 1 wherein said insecticide is an effective amount of dichlorvos.

* * * * *